United States Patent
Zeidan

(10) Patent No.: US 12,037,992 B2
(45) Date of Patent: Jul. 16, 2024

(54) ROADWAYS POWER AND ENERGY MECHANICAL ROAD

(71) Applicant: Numan Zeidan, Hillsborough, CA (US)

(72) Inventor: Numan Zeidan, Hillsborough, CA (US)

( * ) Notice: Subject to any disclaimer, the term of this patent is extended or adjusted under 35 U.S.C. 154(b) by 0 days.

(21) Appl. No.: 18/120,290

(22) Filed: Mar. 10, 2023

(65) Prior Publication Data

US 2023/0287872 A1    Sep. 14, 2023

Related U.S. Application Data

(60) Provisional application No. 63/318,613, filed on Mar. 10, 2022.

(51) Int. Cl.
*F03G 7/00* (2006.01)
*F03G 7/08* (2006.01)

(52) U.S. Cl.
CPC ................................ *F03G 7/081* (2021.08)

(58) Field of Classification Search
CPC ........... F03G 7/081; F03G 7/083; F03G 7/085
USPC .......................................................... 290/1 R
See application file for complete search history.

(56) References Cited

U.S. PATENT DOCUMENTS

| | | | | |
|---|---|---|---|---|
| 4,173,431 | A * | 11/1979 | Smith | F04B 35/00 417/229 |
| 2007/0085342 | A1* | 4/2007 | Horianopoulos | F03G 7/08 290/1 R |
| 2008/0224477 | A1* | 9/2008 | Kenney | F03G 7/08 290/1 R |
| 2015/0115615 | A1* | 4/2015 | Jang | H02K 7/06 290/1 C |
| 2020/0217306 | A1* | 7/2020 | Matthews | F03G 7/083 |
| 2023/0115119 | A1* | 4/2023 | Lamanna | F15B 13/027 290/54 |

* cited by examiner

*Primary Examiner* — Julio C. Gonzalez
(74) *Attorney, Agent, or Firm* — William C. Milks, III

(57) ABSTRACT

A roadways power and energy mechanical road captures and harnesses energies imparted to the roadway by the tires of vehicles driven on the roadway. Pistons, crank shafts, and additional mechanical interconnections mounted in a housing installed beneath the surface of the roadway are connected to generators adjacent to the roadway to convert linear mechanical motion to rotational mechanical motion to generate electrical power.

20 Claims, 10 Drawing Sheets

ROADWAYS POWER AND ENERGY MECHANICAL ROAD

CROSS-REFERENCE TO RELATED PATENT APPLICATION

This application claims the benefit of U.S. Provisional Patent Application No. 63/318,613 filed on Mar. 10, 2022 entitled Freeway/Highway Power and Energy Mechanical Road, the disclosure of which is hereby incorporated herein in its entirety by this reference.

BACKGROUND OF THE INVENTION

1. Field of the Invention

This invention relates to electrical power generation. More particularly, this invention is directed to the generation of electrical power by utilizing mechanical forces produced by vehicles being driven on a roadway, which are mechanically coupled to a generator to produce electrical power.

2. Description of the Prior Art

A supply of electrical power is a fundamental need of modern civilization. Electrical power is relied upon for nearly every aspect of modern human existence.

Currently, the availability of electrical power is dependent in large part on the combustion of fossil fuels such as coal and natural gas to generate electrical power. However, the use of fossil fuels has the disadvantage of producing carbon dioxide that contributes to global warming and is believed to accelerate climate change. The combustion of fossil fuels also produces sulfur dioxide which causes acid rain and other pollutants which result in air pollution that negatively degrades air quality.

Nuclear power plants are also employed to generate electrical power. However, nuclear power plants produce nuclear waste that is both difficult and controversial to dispose of. There have also been nuclear power plant disasters such as Chernobyl and Fukushima.

Other energy sources are also utilized to generate electrical power. Hydroelectric and geothermal electrical power plants avoid many of the disadvantages of fossil fuel and nuclear fuel to generate electrical power. However, hydroelectric power plants depend on a source of water, and geothermal power plants are typically dependent on steam emanating from fissures in the earth, which are not readily available in many geographic areas.

There also other means for generating electrical power, such as solar cells and wind turbines. However, solar cells do not generate electrical power after dusk, and wind turbines do not operate during periods of calm and are a threat to wildlife such as birds and bats.

As a result, there is a need for additional sources of electrical power which are both sustainable and avoid the disadvantages of presently known means for generating electrical power.

Known types of energy utilized to generate electrical power include solar, wind, geothermal, hydrogen, tidal and wave, hydroelectric, thermoelectric, biomass, fossil fuels (e.g., coal, oil, natural gas, etc.), and nuclear power and employ different apparatus to harness these energies (i.e., solar panels, wind turbines, etc.). Electrical power is generated based on those energy sources. Then, the generated electrical power is distributed through transmission lines to power substations in towns and cities.

The known prior art has significant disadvantages regarding the apparatus utilized to capture the energy required to generate electrical power.

Solar panels are inefficient during winter or foggy and cloudy days, especially during freezing low temperatures if the panels become covered with snow and ice and are not able to generate electrical power for long periods of time (e.g., many days).

Wind turbine vanes with blades rotate on average 120 to 130 rpm which results in 10 to 20 turbine shaft rotations a minute when there are strong winds. However, wind turbines discontinue generating electrical power in the absence of wind. Also, there is a high cost to construct and install equipment for wind turbine plants/farms. Furthermore, wind turbines create aesthetic pollution adversely impacting the natural look of the surrounding areas. Other disadvantages of wind turbines are that during freezing low temperatures, and with the lack of winds, they tend to freeze up and stop rotating if they are not supplied with built-in heaters.

One installation of wind turbines to power homes has been deployed to generate electrical power to supply approximately two thousand households (i.e., deployed in the offshore waters of France). However, wind turbines and towers are anchored into the ocean floor, with foundations at the base to support the weight of the wind turbines with the towers which may reach hundreds of feet high with blades that may be more than thirty feet in length. Wind turbines anchored in the floor of seas and oceans are difficult to maintain and repair, because the foundations for wind turbines tend to sink downwardly into the seabed.

Electrical power generated by turbine generators driven by steam heated by combustion of fossil fuels or nuclear fission are expensive to construct and operate because the fuel costs large amounts of money.

Pollution is also a major problem with using fossil fuels to generate electrical power. This has negative effects on the atmosphere and the planet, causing global warming and climate change that result in the melting of ice glaciers, permafrost, tundra, and raising the water level in oceans and seas, potentially causing flooding in towns and cities. Also, heatwaves, drought, and wild fires during the summer are frequent as a result of pollution and global warming and climate change caused by using fossil fuels to generate electrical power, and mudslides and landslides and flooding during the winter and other seasons caused by torrential rain as a result of global warming. Permafrost (the frozen layer below the surface in frigid regions of the planet) and tundra (treeless plains of arctic and subarctic regions) are melting, whereby carbon is released into the atmosphere which is estimated to be about 1600 billion metric tons, and permafrost contains twice as much carbon that is already on the surface or in the atmosphere of the planet. Also, methane and carbon dioxide are released from remains of animals and plant matter trapped within the permafrost. The melting permafrost exposes reservoirs of methane which are expelled into the atmosphere, as well as releases bacteria causing anthrax which is a bacterial disease. The melting of the permafrost and tundra in frigid regions of the planet is an increasing problem because thawing of permafrost and tundra produces greenhouse gases.

Tidal and wave energy to generate electrical power have proven to be inefficient and ineffective for generating electrical power due to the variability of tides and waves. Tidal and wave electrical power generation are also impacted by bad weather such as hurricanes and typhoons.

Hydroelectric generation of electrical power requires building and maintaining dams (i.e., a hydroelectric power plant or impoundment facility). This is a major task and expensive approach to generate electrical power, which utilizes the gravitational force of falling or flowing water. There are also other disadvantages to hydroelectric power generation, including environmental damage and interruption of natural water flow, which can have a great impact on the ecosystems of rivers and the environment, and the risk of floods at lower elevations.

Geothermal electrical power generation may involve deep drilling of one mile or more below the earth's surface to tap into steam or hot water reservoirs underground, which is an expensive technique for extracting heat from the earth's interior to obtain steam with high temperature (300 to 700 degrees Fahrenheit) for steam turbine generators, to produce electrical power. Other disadvantages of utilizing geothermal energy include environmental issues such as surface instability of land as a result of construction and sometimes causing earthquakes, and emission of greenhouse gases from below the surface which pollute and contaminate the surface and the atmosphere.

Hydrogen fuel cells utilize hydrogen which is a highly flammable, dangerous, explosive gas that ignites with a spark when mixed with air or oxygen. Hydrogen can be produced from natural gas and coal, can be extracted from water, or can be produced from biomass gasification to generate electrical power that is expensive. Other disadvantages of hydrogen fuel cells/hydrogen include storage issues, high cost, global warming, and climate change.

Thermoelectric energy generation requires a thermoelectric generator (TEG), also called a Seebeck generator, to generate electrical power directly from heat by converting temperature differences (heat flux) into electrical voltage. The materials to construct the generator must have both high electrical conductivity and low thermal conductivity to be good thermoelectric materials. Thermoelectric power generators utilize water to generate steam for turbine generators (thermo power). Disadvantages of thermoelectric energy for electrical power generation include low efficiency, high cost, high output resistance, efficiency only in selective applications, adverse thermal conditions that require a relatively constant heat source, low energy conversion, and structural failure of TEG elements at high temperatures.

The known prior art techniques for producing electrical power are susceptible to power outages which are common due to extreme weather such as cold stormy weather in the winter and hot weather in the summer causing overloads of circuits during summer, with limited supply of electrical power, which makes these techniques unreliable when needed the most.

Some vehicles are equipped with a solar roof and generate electrical power only for use by the vehicle itself. Goodyear Model BH03 tires generate electricity by the action of certain materials in the tire that capture heat and transform heat energy into electrical power as the tires create friction with a roadway. Thermo piezoelectric material may enable this type of tire to collect heat while the vehicle is moving or stationary to collect heat from an asphalt road or exposure to sunlight. This type of tire generates electrical power to charge the vehicle battery and to charge electric and hybrid automobiles. However, using such tires to generate electrical power for the power grid by transferring generated power from the vehicle using electric cables would require expensive and massive infrastructure changes to the vehicle and the roadways.

A solar panel road protected by silicon and resin made by Colas Co. in France to generate electrical power for homes is fragile and expensive and cannot be angled towards the sun. Moreover, the protective silicon and resin peel off, and debris such as leaves from trees fall and collect on the panels and block the sunlight, such that the panels generate less than half of the electrical power expected. As a result, the one kilometer solar road tested in France was ineffective and inefficient. Furthermore, the panels produced loud noise from vehicles driving over the panels.

The known prior art has many deficiencies and disadvantages regarding electrical power generation. The present invention provides a system to overcome many of the shortcomings of the prior art.

SUMMARY OF THE INVENTION

The present invention is directed to capturing and harnessing energy created by vehicles being driven on roadways such as freeways or highways. The present invention differentiates from any previously known method or apparatus by utilizing the energy that is otherwise wasted and dissipated as heat, noise, and vibration by vehicles traversing a roadway.

The primary object of the present invention is to capture and harness the energy produced by vehicles imparted to a roadway. In one preferred example embodiment, vehicle actuated pistons connected to crank shafts housed below the surface of the roadway and mechanically coupled to generators adjacent to the roadway enable a feasible way to capture and harness the energy imparted by vehicles to the roadway to generate electrical power.

The present invention provides a roadways power and energy mechanical road. In accordance with various examples in accordance with the present invention, mechanical energy created by vehicles driven on the roadway is converted into mechanical energy to produce electrical power.

In accordance with various examples of the present invention, the roadways power and energy mechanical road comprises apparatus to convert linear mechanical motion to rotary mechanical motion which is coupled to a generator to generate electrical power.

In accordance with one example of the present invention, vehicles being driven on a roadway actuate a plurality of pistons which are supported by coil springs. In one example, the pistons may protrude half an inch above the surface of the roadway. The tires of vehicles driven on the roadway actuate the pistons to impart linear motion to hydraulic pistons having uniform strokes, and then these uniform strokes are transferred through connecting rods to crank shafts housed in housings installed below the surface of the roadway. The crank shafts in turn rotate to convert the linear motion of the hydraulic pistons into rotary motion. The rotary motion is then transferred to generators to generate electrical power.

In accordance with an example of the present invention, the cylinders for the pistons, connecting rods, and crank shafts are mounted in a housing beneath the roadway. Preferably, the housing is a modular unit which may be removed periodically (e.g., once a year) for service by using housing handles for lifting by a crane, and then replaced in the roadway. Also, the generators, including long shafts, short high rpm shafts, and shafts of the generators, are housed by nacelles.

Accordingly, the present invention operates as a complete system to capture and harness energies created by the vehicles driven on the roadway, thereby converting those energies to linear mechanical motion and then to mechanical rotary motion to generate electrical power for transmission to towns and cities to provide a source of clean electrical power.

Also, for roadways which are susceptible to being covered with snow and/or ice during cold weather seasons, in accordance with another example of the present invention, electric heating may be utilized to keep snow and ice from accumulating on the roadways power and energy mechanical road.

BRIEF DESCRIPTION OF THE DRAWING

The various example embodiments in accordance with the present invention will be described in conjunction with the accompanying figures of the drawing to facilitate an understanding of the present invention. In the drawing.

DETAILED DESCRIPTION OF THE PREFERRED EXAMPLE EMBODIMENTS

Figure 1A:
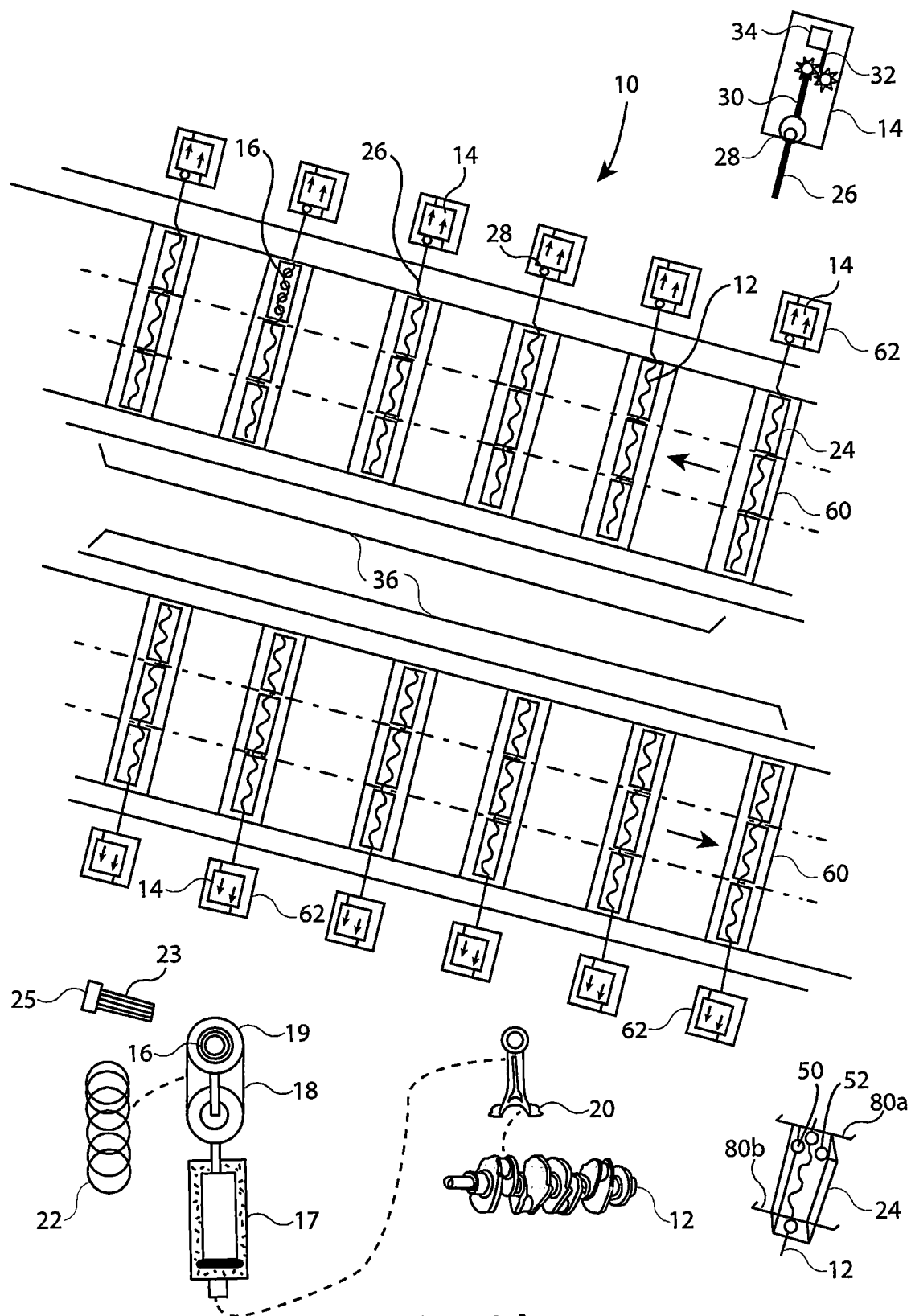
FIG. 1A illustrates a roadways power and energy mechanical road in accordance with one example of the present invention and various details.

Fundamentally, the physics relating to energy produced by forces of rotating tires of vehicles imparted to a roadway is as follows.

Kinetic Energy:

Rotating tires of vehicles have rotational kinetic energy due to rotation of the wheels and constitutes a portion of the total kinetic energy, that is, the amount of kinetic energy that all moving objects have depending on their angular velocity and mass. Kinetic energy is the energy of motion. It is defined as the work needed to accelerate a body of a given mass from rest to its stated velocity. Having gained this energy during its acceleration, the body maintains this kinetic energy unless its velocity changes. The same amount of work is done by the body (i.e., vehicle) when decelerating from its current velocity to a state of rest. When a vehicle brakes, the kinetic energy is changed into heat energy, noise, vibration, etc.

Mechanical Energy:

Moving vehicles possess mechanical energy due to their motion (kinetic energy). There are two types of mechanical energy, namely, motion energy and stored mechanical energy. Mechanical energy is the sum of kinetic and potential energy which is used to produce work, which is energy due to motion and position, that is, potential energy (i.e., stored energy due to the position of a body), or both.

Friction and Traction:

Friction between the tires of a vehicle and a roadway is the force between two objects as one moves over the other, such as vehicle tires and the surface over which the vehicle travels. Traction can be defined as the friction between the vehicle tires and the surface they traverse. Traction is the amount of force applied to the surface of the roadway before the tires slip. A tire will have different traction on different roadway surfaces. The coefficient of friction is based on pairs of surfaces, that is, between the surface of the tires and the roadway surface.

Friction Between a Vehicle and the Roadway:

Gravity pulls downwardly on a vehicle, and the reaction force from the roadway pushes upwardly on the vehicle. The driving force from the vehicle motor propels the vehicle along the roadway. There is friction between the roadway and the tires of the vehicle. Air resistance also acts on the body of the vehicle.

Traction relates to gravity in that it is the result of friction between the roadway and the tires caused by the mass of the vehicle and the pull of gravity. Traction and friction are forces that generate energies that can be captured and harnessed to generate mechanical motion to produce electrical power. Heat energy is also produced by vehicle tires traversing the roadway due to friction. Heat energy may also be harnessed to generate electrical power, for example, to charge the vehicle battery.

Acceleration:

Acceleration is the capacity of a vehicle to gain velocity within a period of time, that is, increase the rate or velocity, which is the rate of change of velocity per unit of time. Acceleration is the net result of any and all forces acting on the vehicle. The calculated net force is equal to the product of the vehicle's mass (a scalar quantity) and its acceleration.

The forward acceleration of the vehicle is a linear acceleration which is a force acting on the vehicle including the tires. When changing direction, it is a non-linear acceleration, which is a sideway force acting on the vehicle including the tires. If the velocity of the vehicle decreases, there is acceleration in the opposite direction, that is, a force in the opposite direction acting on the vehicle including the tires.

Acceleration is a vector quantity having a magnitude and direction. Velocity is the speed having a magnitude, as well as a direction. Forces created by acceleration acting on the vehicle including the tires create energies that can be captured and harnessed to generate electrical power.

Speed and Velocity:

Speed is the rate at which an object (i.e., vehicle) moves and covers distance. The average speed is the distance (scalar quantity) to time ratio. Speed is not dependent on direction and is measured in meters per second (m/s).

Velocity is dependent on both speed and direction, that is, a vector quantity, that has a magnitude and is a function of time and equivalent to specification of the speed and direction of the vehicle. If there is a change in speed, direction, or both, when the vehicle changes velocity it undergoes an acceleration or deceleration. The velocity is measured in meters per second and direction.

Mass and Weight:

The mass of an object is a measure of the object's inertial property, that is, the amount of matter that the object has. The weight of an object is a measure of the force exerted on the object by gravity or the force needed to support the object. The pull of gravity on the object produces a downward acceleration of approximately 9.8 m/s². The weight is a force measured in units of Newtons. Mass is measured in units of kilograms.

In accordance with the various examples of the present invention, mass (matter) and weight (force) of vehicles being driven on a roadway are captured and harnessed as energy created by vehicle tires imparted to a roadway to generate electrical power derived from the interaction between the vehicle tires and the roadway.

Freeways/Highways (Roadways):

Highways typically comprise one or more 12-foot (3.7 m) standard width lanes. Five lanes equals 60 feet in each direction. The outside shoulder width is typically 10 feet (3.0 m) on each side of the roadway. The inside shoulder width is typically 4 feet (1.2 m) on each side of the roadway. The average width of a vehicle is 6 feet.

Highway Reflectors/Raised Pavement Markers:

These devices are typically constructed from plastic, ceramic, thermoplastic paint, or sometimes metal, are in a variety of shapes and colors, and are attached with epoxy glue to the dividing white or dashed lines/broken lines that divide the lanes of the freeway or highway on both sides of the roadway. These devices are sometimes referred to as convex vibration lines, Botts dots, cats eyes, road studs, or road turtles reflectors. Botts dots, for example, are 0.75 inch high by 4 inches in diameter, convexly round. Also, rumble strips are used on roadways as a safety feature to alert drivers, with tactile vibration and audible rumbling inside the vehicle, so that the driver will be more alert and pay attention to other drivers and the roadway, thereby improving awareness and promoting safety.

Freeways/highways (i.e., roadways) are paved with a concrete slab that is typically 11 inches (28 centimeters) to 12 inches thick comprising portland cement concrete (PCC). Asphalt roadways are constructed from asphalt cement (AC) as a binder to hold the aggregate rocks and sand together. Freeways/highways (roadways) constructed with asphalt comprise hot-mix asphalt (HMA) produced from petroleum, that consists of hydrocarbons. An asphalt roadway is constructed utilizing aggregate with a bituminous binder, and underneath this wearing course are material layers that provide structural support for the pavement system. These two types of pavement surfaces form the wearing course which is the upper layer for roadways, that is, rigid pavement that is inflexible, such as a portland cement concrete slab, or flexible such as asphalt cement. Asphalt roadways have better skid resistance and provide good traction.

Roadways comprise as many as four layers: 1. a surface course; 2. a base course; 3. a sub-base; 4. a sub-grade. Also, there is typically an embankment and natural formation or earth foundation.

In the past, roadways have had gravel surfaces, cobble stones, and granite setts were extensively used. However, these surfaces have been typically replaced by asphalt or concrete laid on a compacted base course. Also, there are composite pavement roadways comprising hot-mix asphalt overlaid onto portland cement concrete.

The average traction of tires due to the downward pull of gravity is based on the tires having an average width of approximately one foot or less, so the average traction of tires on the ground and roads is approximately one square foot.

FIG. 1A shows a roadways power and energy mechanical road 10 in accordance with one example of the present invention. As shown in FIG. 1A, pistons 16 are installed in the roadway positioned within the lanes between the white, dashed/broken lines which designate the lanes of the roadway to capture the energy imparted by the tires of vehicles driven on the roadway. Each piston 16 is supported by a coil spring 22 or any other alternative suspension element, such as a shock absorber or strut. Rows of pistons 16 in each lane of the roadway may be spaced 20 feet apart to create energy generating zones 36.

For example, each piston 16 may extend half an inch (0.50 inch) above the surface of the roadway. The top of each piston 16 is actuated downwardly to the level of the road surface when vehicle tires drive over the pistons, which are depressed by the vehicle tires to be level with the road surface. By way of comparison, Botts dots and raised road markers, which are stationary and glued with epoxy to the dashed or broken lines of the roadway, extend 0.75 inch above the surface of the roadway. Therefore, the pistons 16 in accordance with one example of the present invention are less in height than Botts dots and raised road markers or other road reflectors, so that road safety is not diminished.

In accordance with one example of the present invention, the top of each piston 16 may be rectangular and approximately four to six square inches and shaped similarly to raised reflectors or markers on a roadway, or rounded and having a similar diameter as Botts dots. The top of each piston 16 may have an area of half a square foot (i.e., six square inches). Raised reflectors or markers are typically sliver, blue, or yellow in color with reflecting plastic attached on two sides, and Botts dots are typically yellow or bright white in color for visibility. In contrast, the top of each piston 16 in accordance with one example of the present invention may have a non-reflective surface and have a color such as dark brown or black to be distinguishable from other roadway markers.

The typical speed limit for automobiles on freeways and highways is 65 mi/hr. However, vehicles may travel at faster speeds, for example, 75 to 85 mi/hr creating additional energy that is wasted without any current method or apparatus for harnessing some of that energy. Capturing and harnessing energies created by forces of spinning tires of vehicles as a result of rotational kinetic energy, mechanical energy, friction, traction, acceleration, speed, velocity, mass, and weight is feasible in accordance with various embodiments of the present invention. In accordance with the present invention, freeways and highways (roadways) will be enhanced significantly. That is, in addition to the roadways being used to transport vehicles, the roadways will be enhanced to generate electric power.

Considered in more detail, FIG. 1A shows a roadways power and energy mechanical road 10 which includes a plurality of lanes indicated by dashed lines. For example, each side of the roadway may have three lanes as shown in FIG. 1A. A plurality of crank shafts 12 are mounted in housings 24 beneath the surface of the lanes of the roadway. As shown in FIG. 1A, there may be a plurality of crank shafts 12 mounted in the housings 24 positioned at intervals along each lane of the roadway.

As shown in FIG. 1A, a plurality of six crank shafts 12 are mounted in respective housings 24 which may be spaced at intervals across each of the three lanes on each side of the roadway. FIG. 1A also shows generators 14 situated adjacent to the roadway, for example, a plurality of six generators 14 may be installed on each side on the roadway for a total of twelve. The pluralities of crank shafts 12 and generators 14 may be increased to any number. The example shown in FIG. 1A provides the energy generating zones 36 spaced along the roadway, for example, every other mile or every few miles, which is feasible in accordance with the present invention.

Generally, a crank shaft is a shaft that is typically employed in internal combustion engines for vehicles and is composed of ductile iron or forged SAE 1045 steel or similar type of metal. A crank shaft in combination with a connecting rod coupled to a piston converts linear (reciprocating) motion into rotary (rotational) motion such that the vertical movement of the piston becomes rotational movement, whereby power from the energy produced by the engine (piston to connecting rod to crank shaft) of the vehicle is transferred to the drive train and in turn to the wheels and tires of the vehicle, as well supplying rotational motion to the camshaft to control timing of valves which regulate the intake of fuel and air into the cylinders, combustion of the fuel-air mixture, and exhaust from the cylinders in an internal combustion engine. Typically, drive belts are attached to the end of the crank shaft to deliver rotational motion to an alternator which provides electrical power to charge the vehicle battery and supply electrical power to accessories of the vehicle. The length and diameter of the crank shaft are proportional to the engine and vehicle size. In accordance with one example of the present invention, the length of the crank shafts 12 may be between 5.5 to 6 feet, with the diameter for the main journal being 2 to 3 inches and the rod journal having a diameter of 1.75 to 2 inches.

The use of crank shafts 12 housed below the surface of the roadway to capture energy from vehicle tires and convert the energy to mechanical and then to electrical power is feasible with the present invention. As shown in FIG. 1A, each crank shaft 12 is connected to a plurality of pistons 16 having random strokes. As described above, each of the pistons 16 extends, for example, half an inch, above the surface of the roadway. As shown in FIG. 1A, each piston 16 is housed in a circular cylinder 18 having a rim 19 and an opening at its top through which the top of top portion of the piston extends. As shown in FIG. 1A, a coil spring 22 is mounted in the cylinder 18 for each piston 16, which moves the piston upwardly to its initial position after being moved downwardly by the tire of a vehicle which actuates the piston, thereby resulting in rectilinear downward and upward motion of the piston 16 in the cylinder 18.

As shown in FIG. 1A, each piston 16 is connected at its lower end to a hydraulic piston 17 which has a uniform stroke. Hydraulics provide a source of mechanical force or control. That is, hydraulic systems, hydraulic plungers, and mechanisms or forces of conveyance of liquids through pipes and channels, operate as a source of mechanical force or control to transfer pressurized fluid.

In accordance with an example of the present invention, the force on each piston 16 is transferred to the hydraulic piston 17 and in turn to a connecting rod 20 and then to the crank shaft 12 utilizing hydraulics. Alternatively, pneumatic pressure (a pneumatic piston and cylinder) can be employed for the piston 17 in an alternative example, as a source of mechanical force or control.

Preferably, a horizontal support rod 23 which is attached with a hinge 25 to the top portion of the cylinder 18 for upward and downward motion, is attached to the front top of the piston 16 or to the front top of the coil spring 22. The horizontal support rod 23 functions as a support for the piston 16 because the energy and force from the tire of a vehicle on the piston 16 is in forward and downward direction. In an alternative example, a horizontal coil spring (not shown) can be substituted for the horizontal support rod 23 and the hinge 25 to support the top of the piston 16.

As shown in FIG. 1A, the pistons 16, coil springs 22, and cylinders 18, as well as the hydraulic pistons 17, connecting rods 20, and crank shaft 12 are mounted in housings 24 installed below the surface of the roadway. Preferably, the housing 24 comprises housing handles 80*a* and 80*b* which may be connected to a crane (not shown) so that the housing may be removed periodically, for example, once a year, for service of the housed elements mounted in the housing and then the housing may be re-installed. As shown in FIG. 1A, the housings 24 may have vents 50 for ventilation, and the vents, as well as drains 52, are connected to pavement subsurface drainage or a culvert crossing under the roadway. Also, a connecting shaft 26 extends through the housing 24 to connect the crank shaft 12 to the shaft of a generator 14 via a hub 28 to transfer the rotational motion of the crank shaft to a long shaft 30 which is coupled to a short high rpm shaft 32 that transfers mechanical rotation to the shaft of the generator 14 which in turn generates electrical power.

Figure 1B:
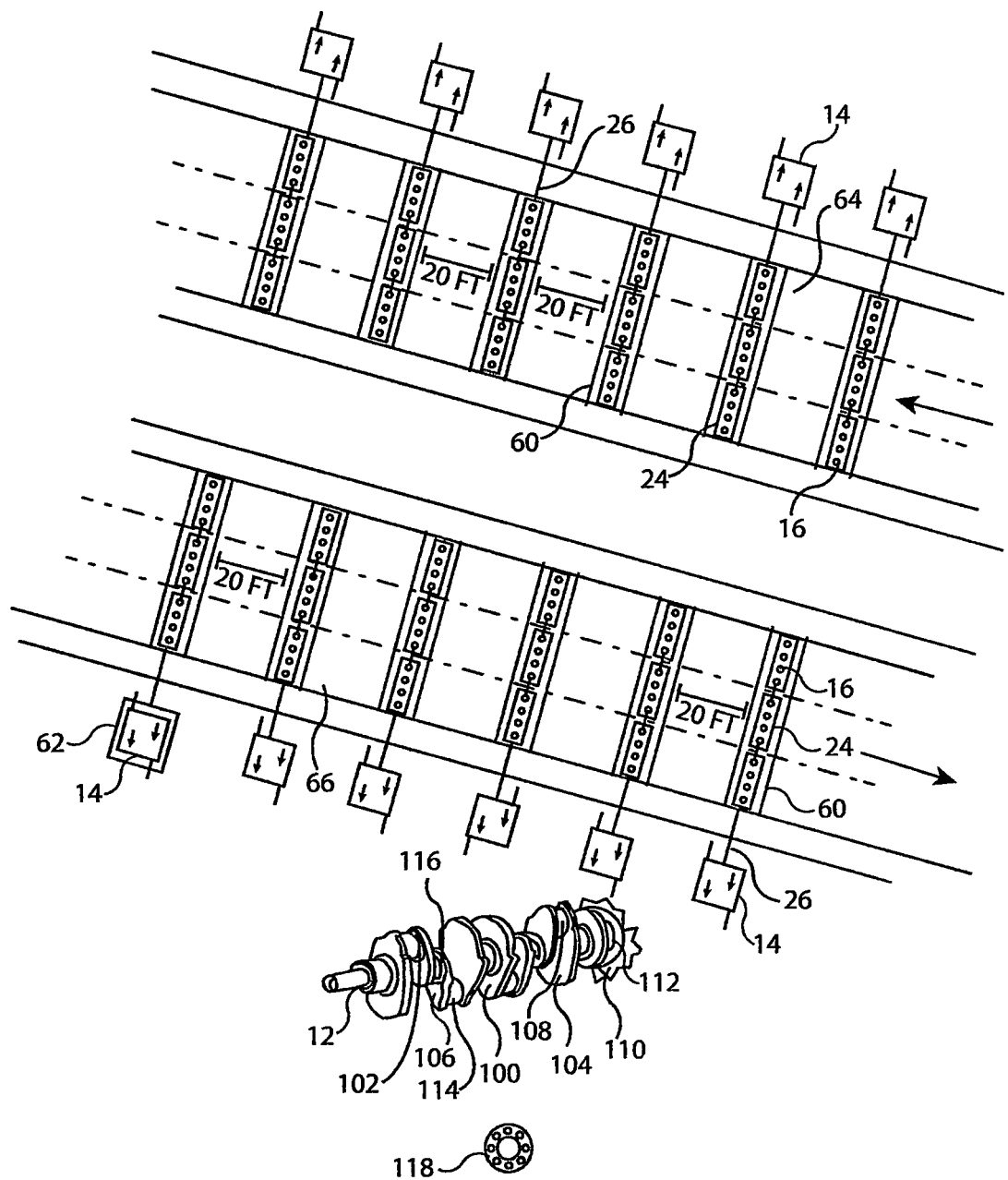
FIG. 1B illustrates the roadways power and energy mechanical road in accordance with one example of the present invention that includes details of a crank shaft.

FIGS. 1A and 1B show a steel casing 60 to contain the housings 24. The housings 24 in each steel casing 60 are interconnected to each other via the connecting shaft 26 extending through each housing to the associated generator 14. FIGS. 1A and 1B also show a steel nacelle 62 housing the associated long shaft 30, short high rpm shaft 32, and generator 14.

FIG. 1B shows the main components associated with the crank shafts 12. The crank shaft 12 preferably comprises a main journal 100, a rod journal 102, a counterweight 104, a main bearing journal 106, a rod bearing journal 108, a flywheel 110 (for conservation of angular momentum and to store rotational energy (i.e., kinetic energy), a flywheel flange 112 at the end of the crank shaft, and also crank pins 114 and crank webs 116 at the middle portion of the crank shaft, as well crank shaft and connecting rod main bearings 118 attached to the main journal and rod journal.

The example of the crank shaft 12 shown in FIG. 1B is similar to a crank shaft of a vehicle, but there is no internal combustion engine or fuel utilized. Also, there is no need for motor oil or lubricants for the pistons or the other components associated with the crank shaft 12, only grease and fluids (i.e., CV joint grease, transmission fluid, differential fluid, or grease utilized in vehicles) to lubricate the bearings of the crank shaft and its associated mechanical parts. In one contemplated alternative example, a pulley having a grooved rim or a sprocket may be substituted for the flywheel 110 to transmit power to the connecting shaft 26 and generator 14.

Figure 1C:
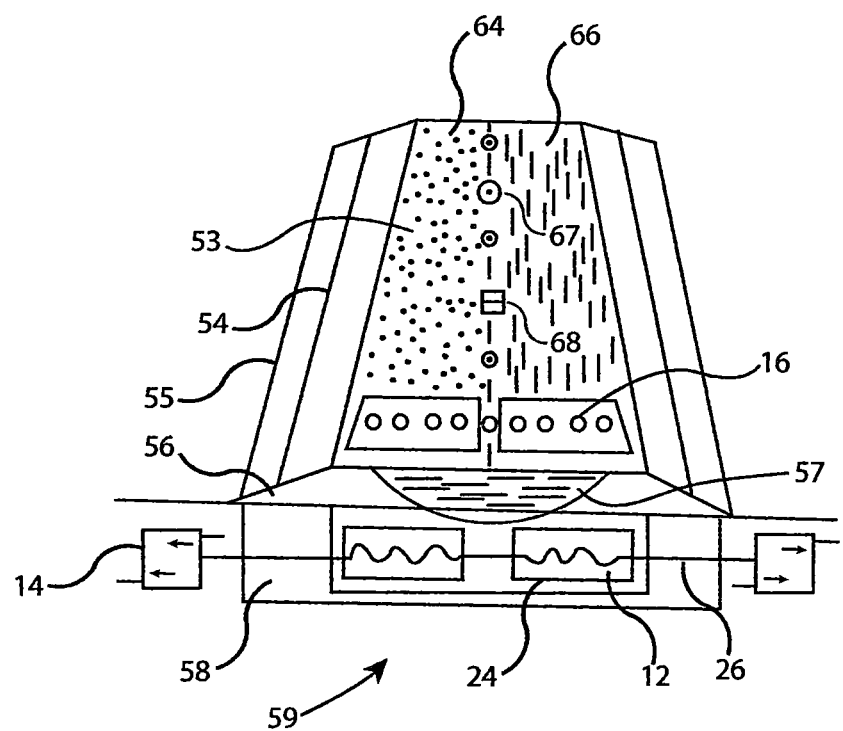
FIG. 1C illustrates the structure of a roadway in accordance with one example of the present invention.

FIG. 1C illustrates the structure of a roadway in accordance with one example of the present invention. The roadway includes a surface course 53, base course 54, sub-base 55, sub-grade 56, embankment 57, earth foundation 58, and energy generating layer 59. FIG. 1C also illustrates a roadway surface which includes asphalt concrete 64 and portland cement concrete 66, and shows examples of road reflectors including Botts dots 67 and raised markers 68.

Figure 2:
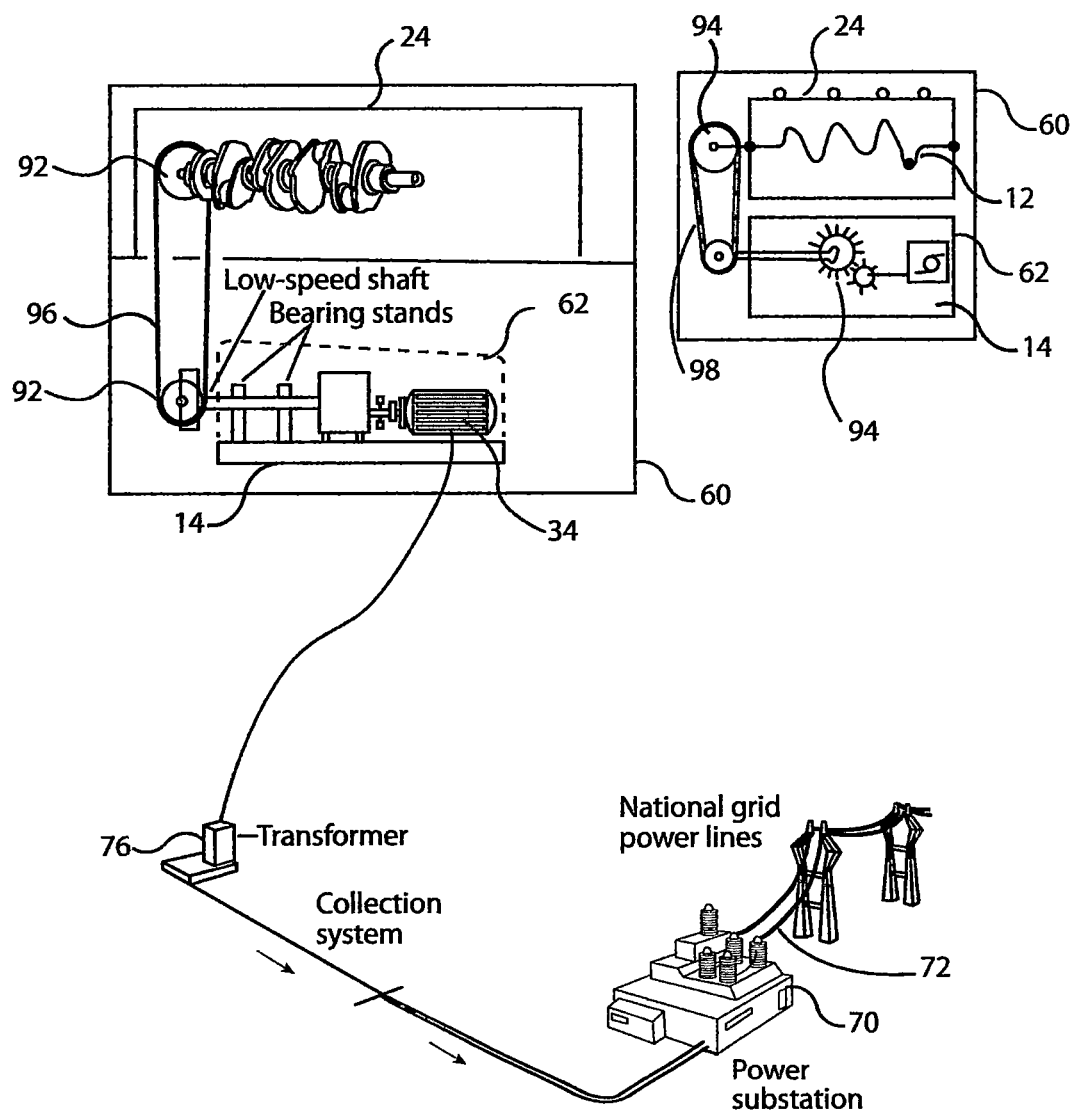
FIG. 2 shows an example in accordance with the present invention including details of the connection between a crank shaft and a generator.

FIG. 2 shows another example in accordance with the present invention with direct attachment between a crank shaft 12 and a generator 14 interconnected with pulleys 92 and a belt 96 or sprockets with toothed wheels 94 and a chain 98.

As shown in FIG. 2, the crank shaft 12 is housed in the housing 24, and the generator 14 is housed in the steel nacelle 62. Also, the housing 24 and steel nacelle 62 are contained within the steel casing 60 which is installed in the roadway to protect all the components associated with the crank shaft 12 and the generator 14 and to support the roadway.

As also shown in FIG. 2, the electrical power generated by the generator 14 may be transmitted to a power substation 70 via a transformer 76 and then distributed by transmission lines 72 to towns and cities.

Figure 3:
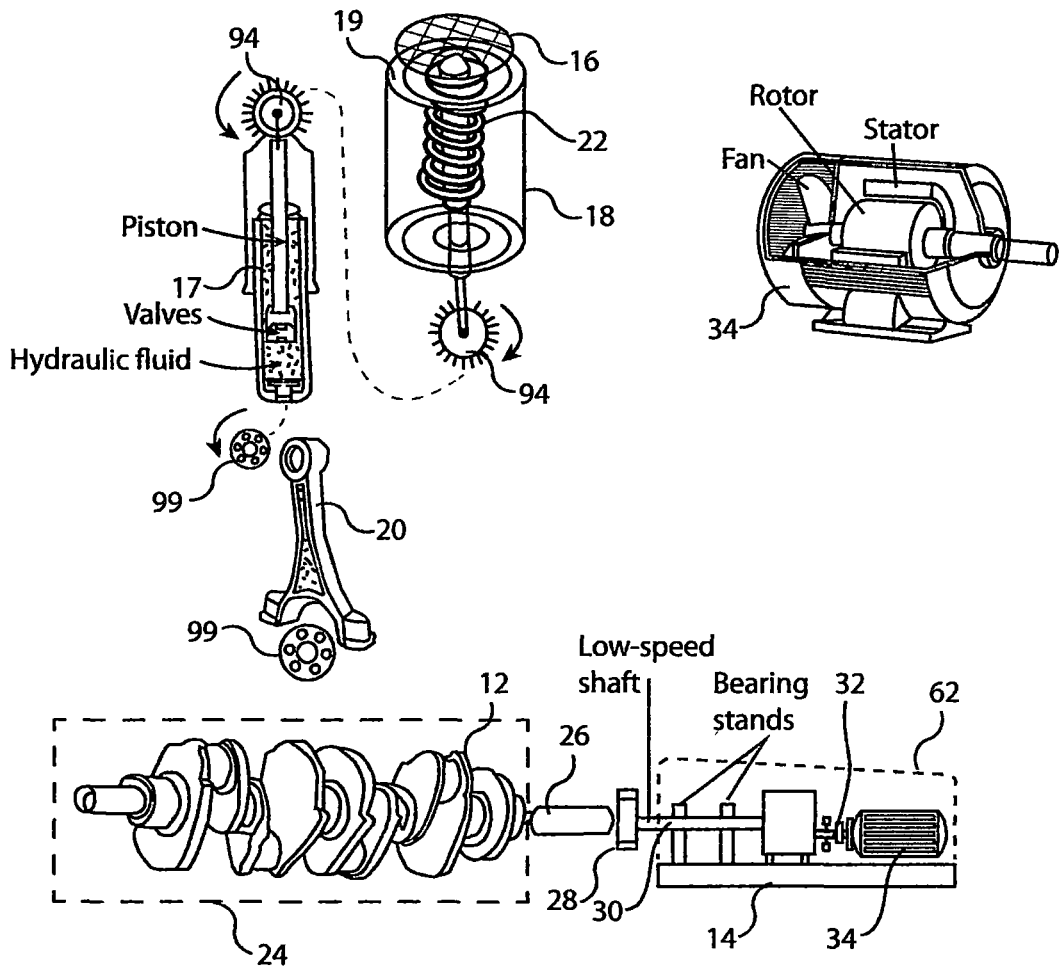
FIG. 3 illustrates exploded views of elements comprising the examples in accordance with the present invention.

FIG. 3 illustrates exploded views of elements comprising the examples in accordance with the present invention described above.

Figure 4:
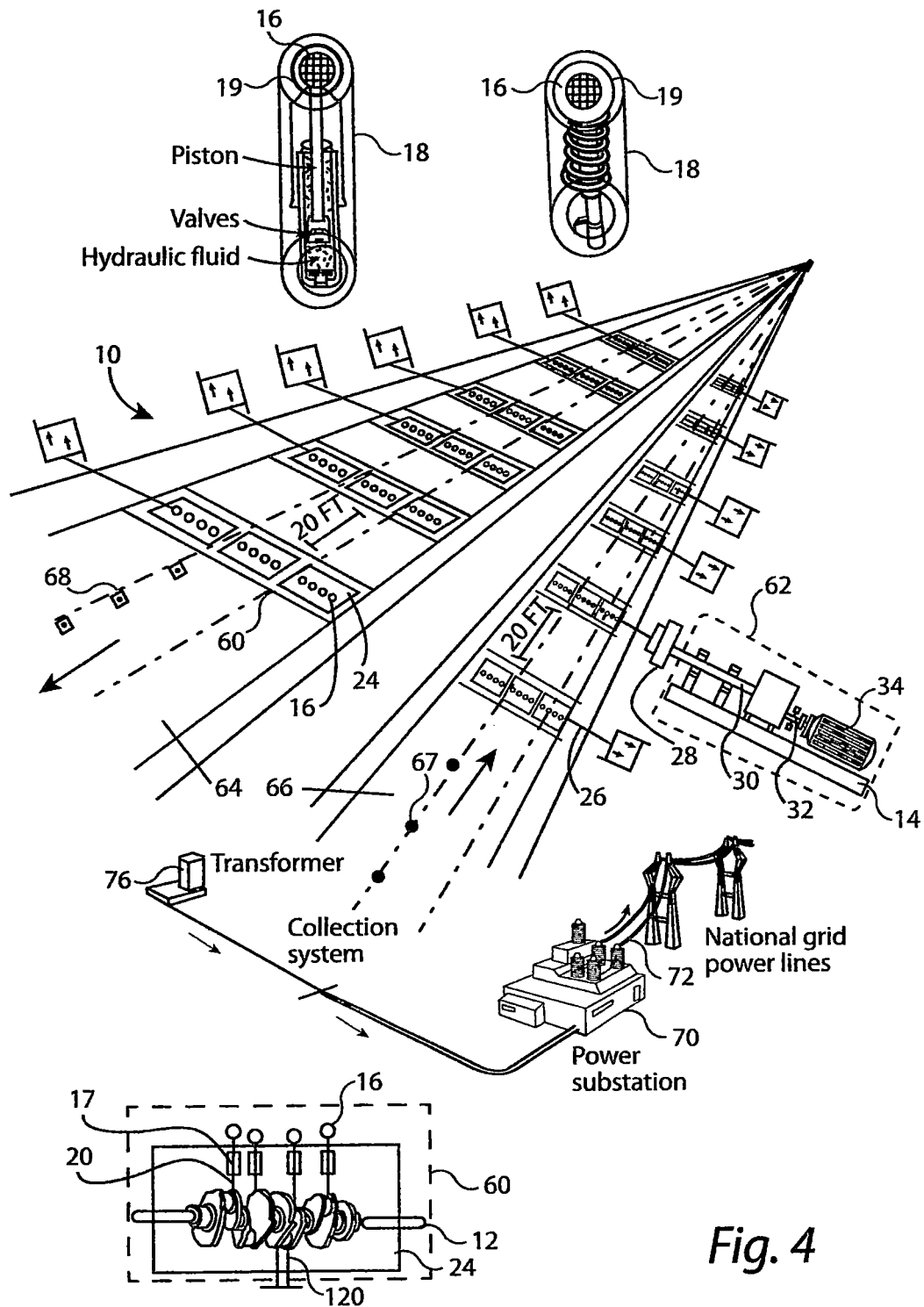
FIG. 4 shows various contemplated modifications of the examples in accordance with the present invention.

FIG. 4 shows various contemplated modifications of the examples in accordance with the present invention described above. For example, the crank shaft 12 may be supported by a center support 120. Also, the coil spring 22 may be substituted with shock absorbers or struts supporting the piston 16 for upward and downward motion. Generally, shock absorbers are sealed cylinders filled with hydraulic fluid with a plunger/piston inside. A force applied to the shock absorber forces the plunger/piston through the fluid. Struts are shock absorbers that incorporate a coil spring and a shock absorber in a single unit.

Shock absorbers and struts are typically utilized in the suspension systems of vehicles to help negotiate rough roads, bumps, and road hazards. Any of these elements may be utilized in combination with the piston 16 that is housed in the cylinder 18 and connected to the hydraulic piston 17 which is connected to the connecting rod 20 that is in turn connected to the crank shaft 12 so that the vehicle tires remain even with the roadway after the piston 16 is actuated downwardly to be even with the roadway surface. Utilizing a shock absorber or strut as a substitute for the coil spring 22 maintains safety. Drivers will not notice the up and down motion of the pistons 16 when vehicle tires drive over the pluralities of pistons 16 in the energy generating zones 36 on freeways or highways.

Figure 5:
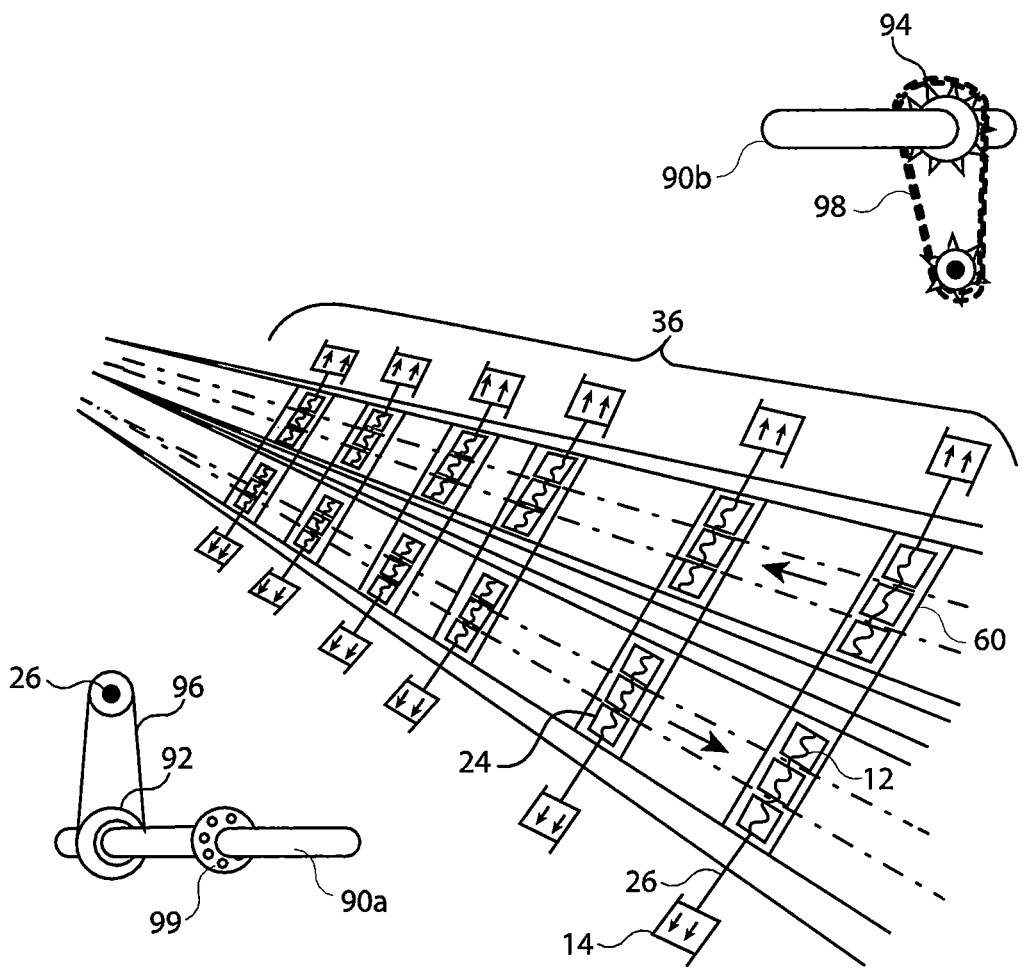
FIG. 5 shows energy generating zones of the roadways power and energy mechanical road in accordance with one example of the present invention and various details.
Figure 5:
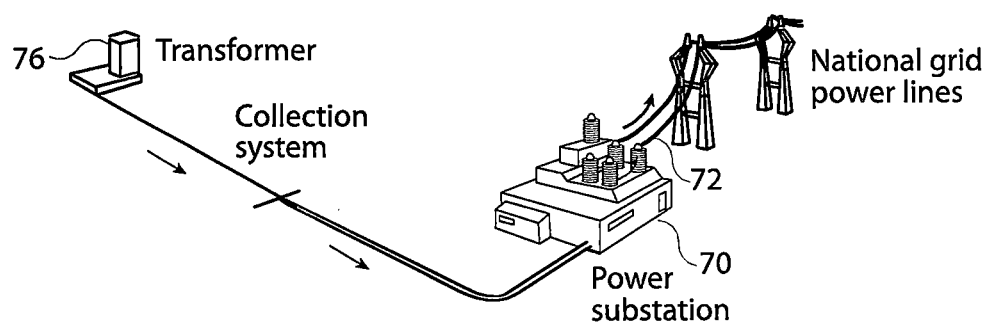

FIG. 5 shows energy generating zones 36 on both sides of the roadways power and energy mechanical road 10. The number of energy generating zones 36 may be every mile or every other mile, for example, connected to the power substation 70 for transmission via transmission lines 72 to towns and cities.

FIG. 5 also shows contemplated modifications in accordance with the present invention. As shown in FIG. 5, the connecting shaft 26 connected to the crank shaft 12 may be a mechanical shaft consisting of a rotating machine element, typically circular in cross-section, utilized to transmit power from one part to another, connected, for example, to a pulley or sprocket to transmit rotary motion via mating gears, belts, or chains to another rotating machine element. As shown in FIG. 5, interconnecting shafts 90a or 90b, pulleys 92 and a belt 96, or sprockets 94 and a chain 98 may be utilized to interconnect the connecting shaft 26 to the generator 14. Furthermore, a bearing 99 may be utilized to support the interconnecting shaft 90a.

Figure 6:
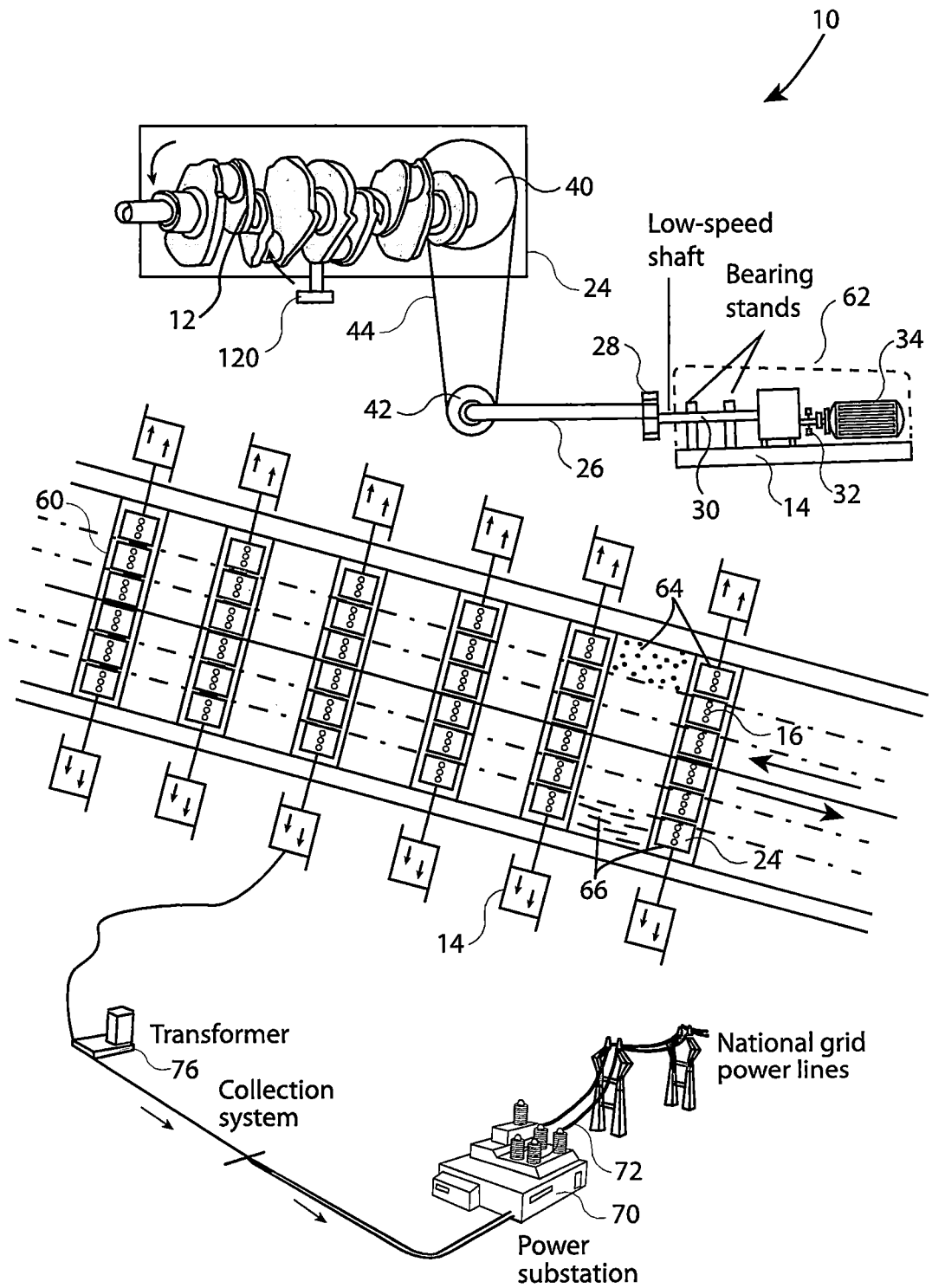
FIG. 6 shows the roadways power and energy mechanical road in accordance with another example of the present invention and various details.

FIG. 6 shows the end of the crank shaft 12 connected to a pulley 40 which is coupled to a pulley 42 by a belt 44. The pulleys 40 and 42 are each configured as a wheel having a grooved rim and are coupled by the belt 44 to increase the speed of rotation of the crank shaft 12, because the pulley 40 has a larger diameter than the pulley 42. The rotational speed of the connecting shaft 26 can be increased, for example, by a multiple of ten employing the pulleys 40 and 42. The connecting shaft 26 may in turn be connected to the hub 28 to transfer the increased rotational speed to the generator 34 to generate electrical power for towns and cities.

As shown in FIGS. 1-6, in accordance with various examples of the present invention, the coil spring 22 supports the piston 16 and displaces the piston 16 upwardly, for example, to one half inch above the surface of the roadway. The piston 16 (random strokes) captures energy imparted by the vehicle tires, depressing the piston 16 (random strokes) and transfers the energy to the hydraulic piston 17 (uniform strokes). The connecting rod 20 transfers the energy from the hydraulic piston 17 to the crank shaft 12 to produce rotational motion. The crank shaft 12 is utilized to change linear motion to rotational motion to rotate the shaft of the generator 14 to transfer the rotational motion to the generator shaft. The housing 24 contains the crank shaft 12 and is coupled to the connecting shaft 26 which is in turn connected to the hub 28 to transfer the rotational motion from the crank shaft 12 to the hub 28 which is in turn connected to the long shaft 30 which is connected to the short high rpm shaft 32 connected to the generator 34 housed in the nacelle 62. A large pulley 40 may be connected to the crank shaft 12, and a small pulley 42 may be connected to the connecting shaft 26 by a belt 44 to couple the large and small pulleys to transfer increased rotational speed to the generator 34.

Figure 7:
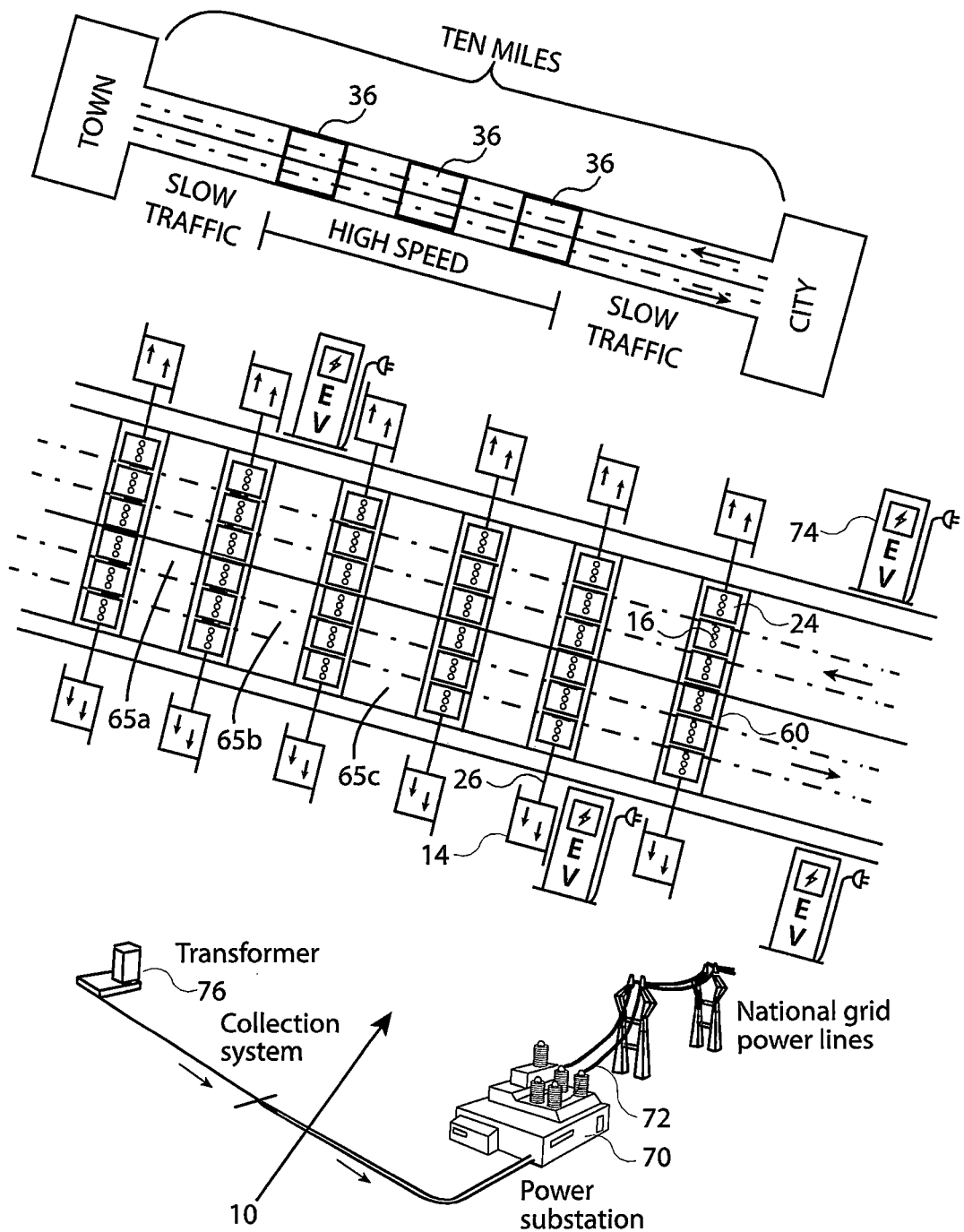
FIG. 7 shows the roadways power and energy mechanical road in accordance with another example of the present invention having a plurality of energy zones on a roadway comprising electrical charging stations for electric vehicles.

FIG. 7 shows the roadways power and energy mechanical road 10 having a plurality of energy zones 36, for example, every other mile within a ten mile span of the roadway. As shown in FIG. 7, the roadway comprises a fast lane 65a, a middle lane 65b, and a slow lane 65c with the housings 24 installed in the steel casing 60 beneath the surface of the roadway. FIG. 7 also shows a plurality of electrical charging stations 74 for electric vehicles, as well as electric transformers 76 and power substations 70 to transfer electrical power via towns and cities.

Figure 8:
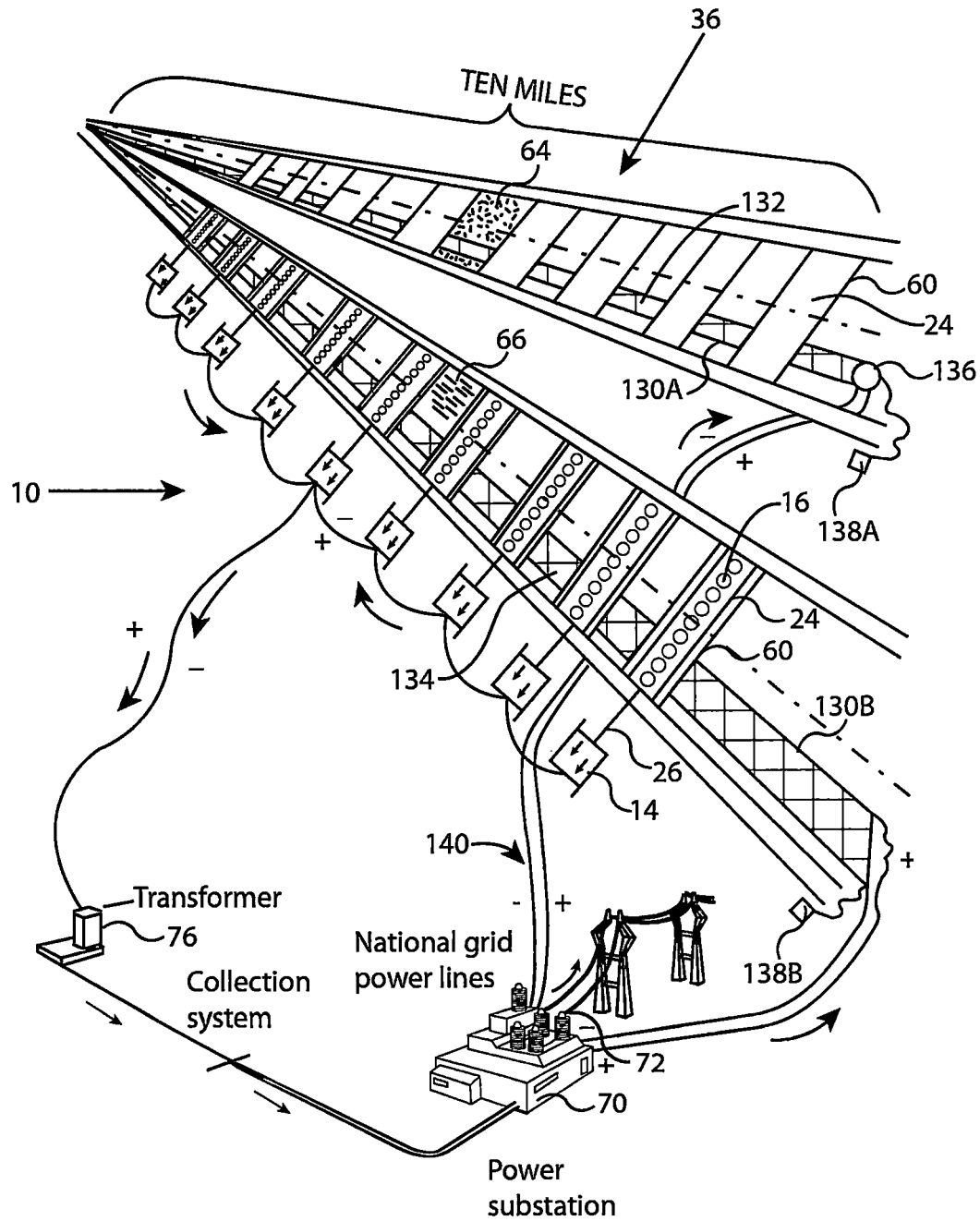
FIG. 8, shows the roadways power and energy mechanical road in accordance with another example of the present invention having electric heating to keep snow and ice from accumulating on the roadway.

As shown in FIG. 8, for roadways which are susceptible to being covered with snow and/or ice during cold weather seasons, in accordance with another example of the present invention, electric heating may be utilized to keep snow and ice from accumulating on the roadways power and energy mechanical road 10. Electric heaters may utilize Nichrome or any other heating element, such as copper or aluminum, and formed as a coil, wire, strip, or ribbon. Electric heaters deliver radiant heat through heated cables, mesh, preformed mats, or elements embedded under surface of concrete or asphalt.

FIG. 8 shows one example in accordance with the present invention of the roadways power and energy mechanical road 10 having electric heaters 130A and 130B installed under the surface of the roadway paved with asphalt 64 and/or concrete 66 to warm the surface of the roadway to more than the freezing temperature of 32 degrees F. to prevent snow and/or ice from accumulating on the surface of the roadway to maintain the roadway open and the roadways power and energy mechanical road 10 in accordance with the present invention operational to generate electrical power during cold weather seasons.

As shown in FIG. 8, the electric heater 130A may comprise a heated wire or cable 132 as a heating element. Preferably, as shown in FIG. 8, the heated wire or cable 132 is housed within a conduit, pipe, or tube 136 to protect the electric wire or cable. Alternatively, as also shown in FIG. 8, an electric heater 130B may comprise preformed mesh 134 as a heating element. FIG. 8 also shows an electrical wire 140 to supply electrical power to the electric heaters 130A and 130B, which are preferably supplied with electrical power generated by the roadway power and energy mechanical road 10 in accordance with the present invention. Additionally, thermostats 138A and 138B are connected to the electric heaters 130A and 130B, respectively, to actuate the electric heaters 130A and 130B when the temperature decreases to 32 degrees F. to warm the surface of the roadway to avert snow and/or ice from accumulating on the roadway and enable the roadway power and energy mechanical road 10 to generate power for towns and cities located in areas where the temperature may fall to 32 degrees F. or below.

The roadways power and energy mechanical road 10 in accordance with the various example embodiments of the present invention has many advantages. These advantages include:

1. Harnessing energy from vehicles, and converting this energy to electrical power. The housing 24 for the crank shaft 12 is beneath the surface of the roadway within a steel casing 60, installed for use and assessable to be maintained or replaced. Only the top of the piston 16 extends above the roadway surface.
2. Capturing energy and transforming it to mechanical power and then to electrical power employing a crank shaft and generator without utilizing any type of fuel which costs large amounts of money to operate.
3. Better for the environment and the ozone layer, because the roadways power and energy mechanical road in accordance with the present invention does not use fossil fuels or produce pollution. Instead, it utilizes mechanical energy.
4. Generating electrical power as a result of driving vehicles over the pistons 16 connected to the crank shafts 12 and generators 14 or 34, whereby electric power is generated whenever vehicles are being driven on the roadway, whether during daylight hours or at night.
5. Supplying electrical power to charging stations located along the roadways power and energy mechanical road to charge electric and hybrid vehicles, because the greatest barrier to transition to electric vehicles is currently the limited distance they can travel on a charge.
6. By utilizing mechanical energy to generate electrical power for electric and hybrid vehicles without fossil fuels, makes this invention better suited for the environment and spending less money on fuels to generate electrical power.
7. By providing a more reliable source of electrical power. That is, if the weather is rainy, foggy, or cloudy, hot or cold, windy, or stormy, vehicles being driven on the roadways power and energy mechanical road in accordance with the present invention over the pistons 16 connected to the crank shafts 12 connected to generators 14 or 34 generate electrical power.
8. By having the generators 14 housed within nacelles enables generation of electrical power unlike wind turbines which endanger wildlife such as birds and bats.
9. The housing 24 may be two feet wide by two feet deep, and approximately six to eight or ten feet in length, enabling the housings to be installed beneath the surface of roadway in steel casings, which may be easily installed and removed to service the piston 16, hydraulic piston 17, connecting rod 20, and crank shaft 12 periodically, for example, once a year.
10. No underground cables or electrical wiring is housed in the housing 24, thereby avoiding electrical currents which would pose safety risks.
11. The roadways power and energy mechanical road in accordance with the present invention is suitable for deployment for cities and towns having roads and streets near the roadways needed to accommodate the various examples in accordance with the present invention.
12. Freeways and highways have an average of two to five lanes in each direction, whereby two to five crank shafts 12 may be interconnected with sprockets (toothed wheels/cogwheels) in a rectilinear formation and installed beneath the surface of all lanes to capture and harness the energy from the fast lanes forming a straight line with the other lanes to the shoulders on each side of the roadway, and connected to the generators 14 or 34 adjacent to the roadway, thereby harnessing energies from all lanes of both sides of the roadway and converting those energies to electrical power for transmission of electrical power to towns and cities.
13. By harnessing mechanical energy imparted by vehicles being driven on the roadways power and energy mechanical road in accordance with the examples of the present invention enables charging stations to be installed at locations along the roadway to enable the charging of electric and hybrid vehicles to facilitate the transition to electric vehicles.
14. Using mechanical energy to supply electrical power to towns and cities reduces global warming.

The example embodiments in accordance with the present invention described above are provided by way of example only, and various additional modifications which will be apparent to persons skilled in the art are contemplated. Accordingly, the scope of the present invention can only be ascertained with reference to the appended claims.

What is claimed is:

1. A system for generation of electrical power utilizing mechanical forces produced by vehicles being driven on a surface of a roadway having one or more lanes, comprising:

a plurality of pistons and cylinders, each of said pistons having a first end and a second end, each said piston being housed in a respective cylinder for rectilinear movement, wherein the pistons and cylinders are installed in the roadway with the first end of each said piston extending above the surface of the roadway by a predetermined distance so that the first end of each said piston is displaced downwardly by tires of vehicles driven on the surface of the roadway;

means housed in the cylinder of each said piston to apply a force to displace the top of piston upwardly so that the top of the piston extends above the surface of the roadway to the predetermined distance above the surface of the roadway;

a plurality of hydraulic or pneumatic pistons and cylinders, each of said pistons of said hydraulic or pneumatic pistons and cylinders having a first end and a second end and being housed in a respective cylinder for rectilinear movement, wherein the first end of each of said pistons of the hydraulic or pneumatic pistons and cylinders is connected to the second end of a respective one of said pistons installed in the roadway;

a plurality of connecting rods, each of said connecting rods having a first end and a second end, wherein the first end of each of said connecting rods is connected to the second end of a respective one of the pistons of the hydraulic or pneumatic pistons and cylinders;

a crank shaft having a first end and a second end and a plurality of rod journals, wherein the second end of each of the connecting rods is connected to a respective one of the plurality of rod journals;

a connecting shaft having first and second ends, wherein the first end of the connecting shaft is connected to one of the first and second ends of the crank shaft; and a generator having a shaft, wherein the shaft of the generator is coupled to the second end of the connecting shaft;

whereby downward linear mechanical motion of the pistons which extend above the surface of the roadway caused by contact of vehicle tires is converted to rotational motion transferred to the generator to generate electrical power.

2. The system of claim 1 wherein the predetermined distance is 0.5 inch.

3. The system of claim 1 wherein the means housed in the cylinder of each piston and cylinder to apply a force to displace the top of said piston upwardly is a coil spring.

4. The system of claim 1 wherein the means housed in the cylinder of each piston and cylinder to apply a force to displace the top of said piston upwardly is a shock absorber.

5. The system of claim 1 wherein the means housed in the cylinder of each piston and cylinder to apply a force to displace the top of said piston upwardly is a strut.

6. The system of claim 1, further comprising a housing, wherein the plurality of pistons and cylinders, the means housed in the cylinder of each piston and cylinder to apply a force to displace the top of said piston upwardly so that the top of said piston extends above the surface of the roadway to the predetermined distance above the surface of the roadway, the plurality of hydraulic or pneumatic pistons and cylinders, the plurality of connecting rods, the crank shaft; and the connecting shaft are mounted in the housing.

7. The system of claim 1, further comprising a nacelle, wherein the generator is housed in the nacelle.

8. The system of claim 6, further comprising a steel casing, wherein the housing is positioned in the steel casing.

9. The system of claim 8 wherein the steel casing is installed beneath the roadway.

10. The system of claim 1, further comprising:
a hub connected to the second end of the connecting shaft;
a long shaft having a first end and a second end, wherein the first end of the long shaft is connected to the hub;
a short high rpm shaft having a first end and a second end, wherein the first end of the short high rpm shaft is coupled to the second end of the long shaft;
wherein the second end of the short high rpm shaft is connected to the shaft of the generator.

11. The system of claim 1, further comprising:
a first pulley having a first diameter, wherein the first pulley is connected to the second end of the connecting shaft;
a second pulley having a second diameter, wherein the second pulley is connected to the shaft of the generator; and
a belt to couple the first and second pulleys.

12. The system of claim 11, wherein the first diameter is greater than the second diameter to transfer greater rotational speed to the shaft of the generator.

13. The system of claim 1, further comprising:
a first sprocket having a first diameter, wherein the first sprocket is connected to the second end of the connecting shaft;
a second sprocket having a second diameter, wherein the second sprocket is connected to the shaft of the generator; and
a chain to couple the first and second sprockets.

14. The system of claim 13, wherein the first diameter is greater than the second diameter to transfer greater rotational speed to the shaft of the generator.

15. The system of claim 1, wherein the generator has an electrical output, further comprising:
a transformer having an input and an output, wherein the input of the transformer is connected to the output of the generator; and
a power substation connected to the output of the transformer.

16. The system of claim 1, wherein the generator has an output, further comprising:
at least one electric charging station connected to the output of the generator;
whereby the generator supplies electrical power to the at least one electric charging station.

17. The system of claim 1, wherein the generator has an output, further comprising:
at least one electric heater installed in the roadway, the electric heater having an input connected to the output of the generator;
whereby the generator supplies electrical power to the at least one electric charging station.

18. The system of claim 16, wherein the generator has an output, further comprising:
at least one electric heater installed in the roadway, the at least one electric heater having an input connected to the output of the generator;
whereby the generator supplies electrical power to the at least one electric heater.

19. The system of claim 17 wherein the electric heater comprises a heating element comprising one of the group of heating elements consisting of Nichrome, copper, and aluminum formed as a coil, wire, strip, or ribbon embedded under surface of the roadway.

20. The system of claim 17, comprising a thermostat connected between the output of the generator and the input of the at least one electric heater to connect electrical power to the at least one electric heater when the temperature is, 32 degrees F. or lower.

* * * * *